(12) United States Patent
Pettersson et al.

(10) Patent No.: US 9,541,371 B2
(45) Date of Patent: Jan. 10, 2017

(54) ARTICULATED ARM CMM

(71) Applicant: HEXAGON TECHNOLOGY CENTER GMBH, Heerbrugg (CH)

(72) Inventors: Bo Pettersson, London (GB); Pascal Jordil, Ecoteaux (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 158 days.

(21) Appl. No.: 14/406,718

(22) PCT Filed: Jun. 20, 2013

(86) PCT No.: PCT/EP2013/062855
§ 371 (c)(1),
(2) Date: Dec. 9, 2014

(87) PCT Pub. No.: WO2013/190031
PCT Pub. Date: Dec. 27, 2013

(65) Prior Publication Data
US 2015/0153149 A1 Jun. 4, 2015

(30) Foreign Application Priority Data
Jun. 22, 2012 (EP) ..................................... 12173085

(51) Int. Cl.
*G01B 7/008* (2006.01)
*B25J 18/00* (2006.01)
(Continued)

(52) U.S. Cl.
CPC ................ *G01B 7/008* (2013.01); *B25J 18/00* (2013.01); *G01B 5/008* (2013.01); *G01B 21/045* (2013.01); *G01D 5/241* (2013.01)

(58) Field of Classification Search
CPC ....... G01B 7/008; G01B 5/008; G01B 21/045; B25J 18/00; G01D 5/241
(Continued)

(56) References Cited

U.S. PATENT DOCUMENTS 5,148,377 A * 9/1992 McDonald ........... G01B 5/0025
33/503
5,757,499 A * 5/1998 Eaton ....................... G01S 5/16
356/141.3
(Continued)

FOREIGN PATENT DOCUMENTS

CN 102143827 A 8/2011
DE 39 18 587 A1 12/1989
(Continued)

OTHER PUBLICATIONS

European Search Report dated Nov. 7, 2012 as received in Application No. EP 12 17 3085.

*Primary Examiner* — R. A. Smith
*Assistant Examiner* — Tania Courson
(74) *Attorney, Agent, or Firm* — Maschoff Brennan

(57) ABSTRACT

The invention relates to an articulated arm CMM, which is constructed in a modular way, and a modular assembling kit for constructing such an articulated arm CMM, comprising an articulated arm having a first end and a second end, wherein the second end is configured to support a tool. The articulated arm comprises at least two arm sections, connected to one another by pivot joints with integrated angle encoders. The arm sections are configured as modules having a PCB unit, said PCB unit comprises an elongated PCB section element and at least one PCB encoder element. The PCB encoder elements are configured to build an angle encoder and the PCB section elements comprise electronic transmission means for transmitting the encoder signals (Continued)

from the PCB encoder elements toward a circuit deriving the relative position between the arm sections.

21 Claims, 5 Drawing Sheets

(51) Int. Cl.
*G01B 21/04* (2006.01)
*G01B 5/008* (2006.01)
*G01D 5/241* (2006.01)

(58) Field of Classification Search
USPC .................................. 33/502–503, 550–551,
553–554, 33/556–557, 560
See application file for complete search history.

(56) References Cited

U.S. PATENT DOCUMENTS

| | | | | |
|---|---|---|---|---|
| 5,768,792 | A * | 6/1998 | Raab | G05B 19/4207 33/503 |
| 7,051,447 | B2 * | 5/2006 | Kikuchi | G01B 21/04 33/366.11 |
| 7,395,606 | B2 * | 7/2008 | Crampton | B25J 13/088 33/503 |
| 7,693,325 | B2 * | 4/2010 | Pulla | G01B 21/04 33/503 |
| 7,774,949 | B2 * | 8/2010 | Ferrari | G01B 5/008 33/503 |
| 7,954,250 | B2 * | 6/2011 | Crampton | B25J 13/088 33/503 |
| 8,112,896 | B2 * | 2/2012 | Ferrari | B25J 9/1692 33/1 PT |
| 8,497,901 | B2 * | 7/2013 | Pettersson | 348/135 |
| 8,516,711 | B2 | 8/2013 | Pettersson | |
| 8,677,643 | B2 * | 3/2014 | Bridges | G01B 11/005 33/503 |
| 8,763,267 | B2 * | 7/2014 | Duportal | G01B 5/008 33/503 |
| 2004/0111908 | A1 | 6/2004 | Raab et al. | |
| 2005/0166413 | A1 | 8/2005 | Crampton | |
| 2009/0083985 | A1 * | 4/2009 | Ferrari | G01B 5/008 33/503 |
| 2011/0107611 | A1 | 5/2011 | Desforges et al. | |
| 2011/0107612 | A1 | 5/2011 | Ferrari et al. | |
| 2012/0084988 | A1 | 4/2012 | Tait | |

FOREIGN PATENT DOCUMENTS

| | | |
|---|---|---|
| DE | 4403901 A1 | 8/1994 |
| DE | 60318396 T2 | 5/2008 |
| EP | 2108917 A1 | 10/2009 |
| EP | 2283311 B1 | 2/2011 |
| WO | 2011/117171 A1 | 9/2011 |

* cited by examiner

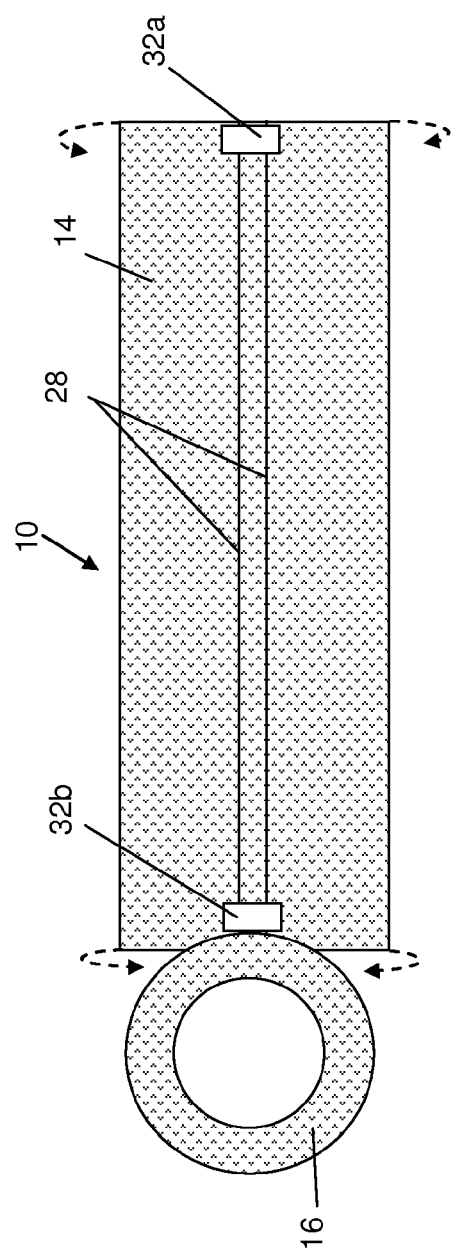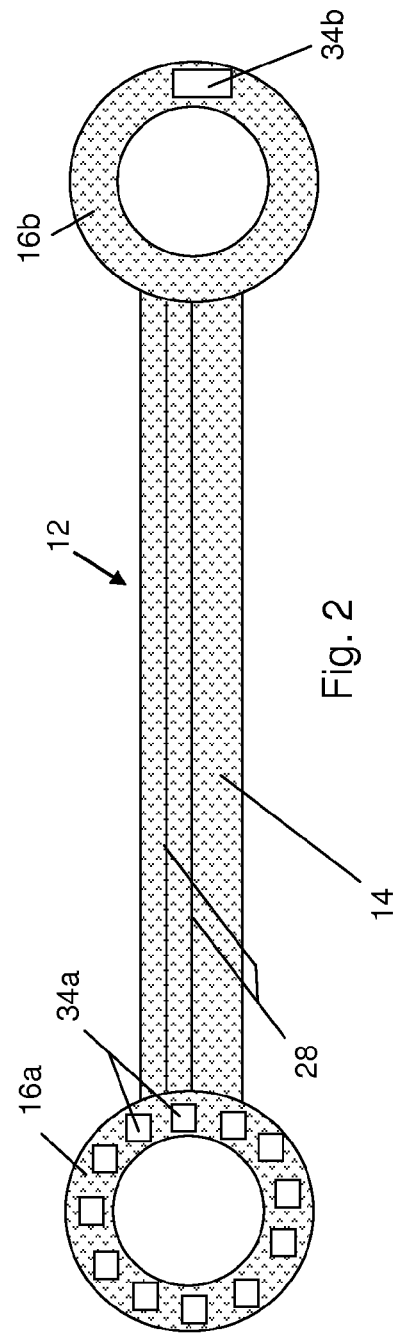

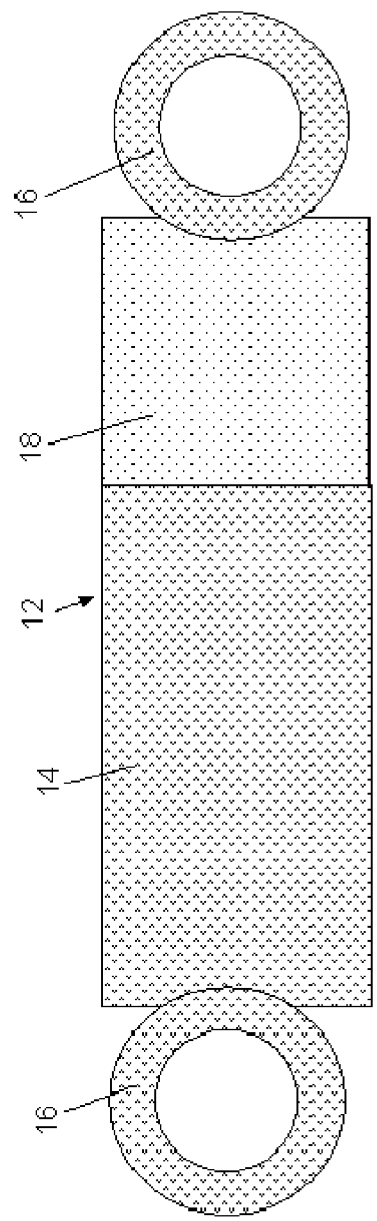
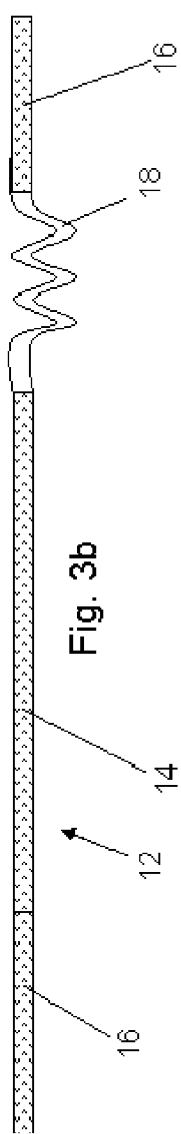
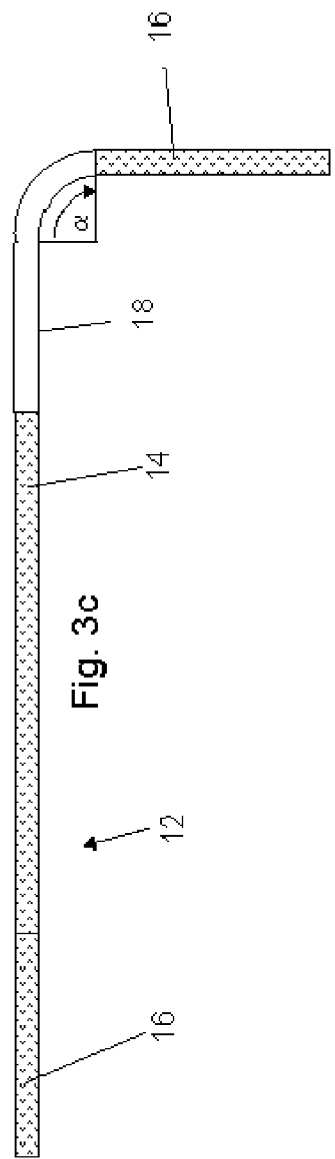
Fig. 3a
Fig. 3b
Fig. 3c

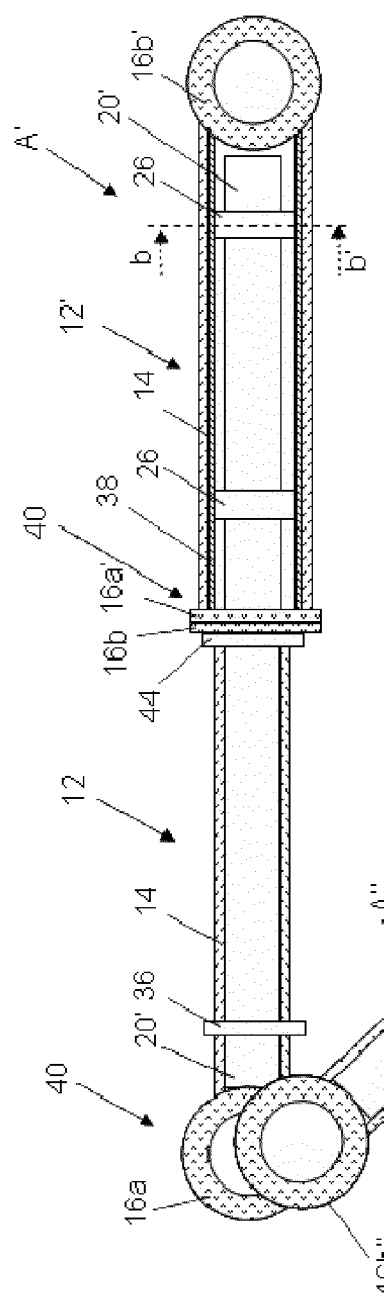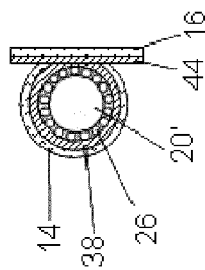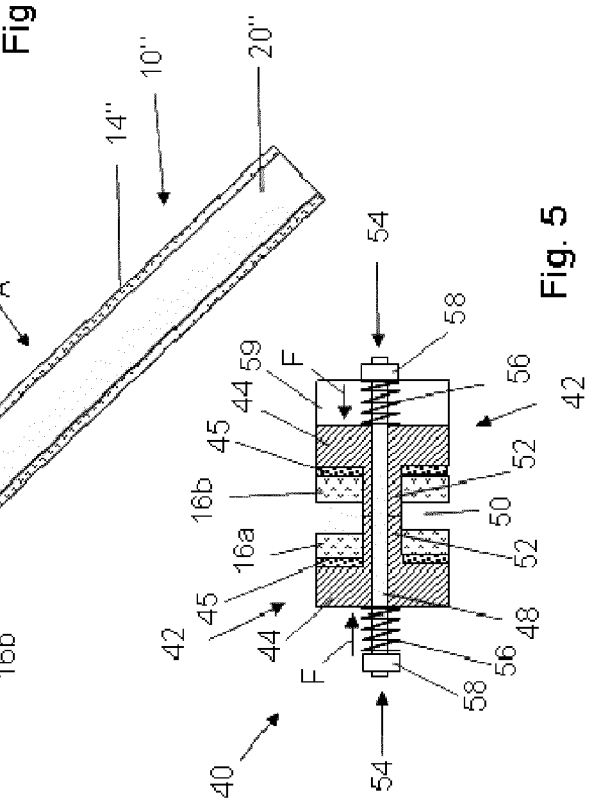

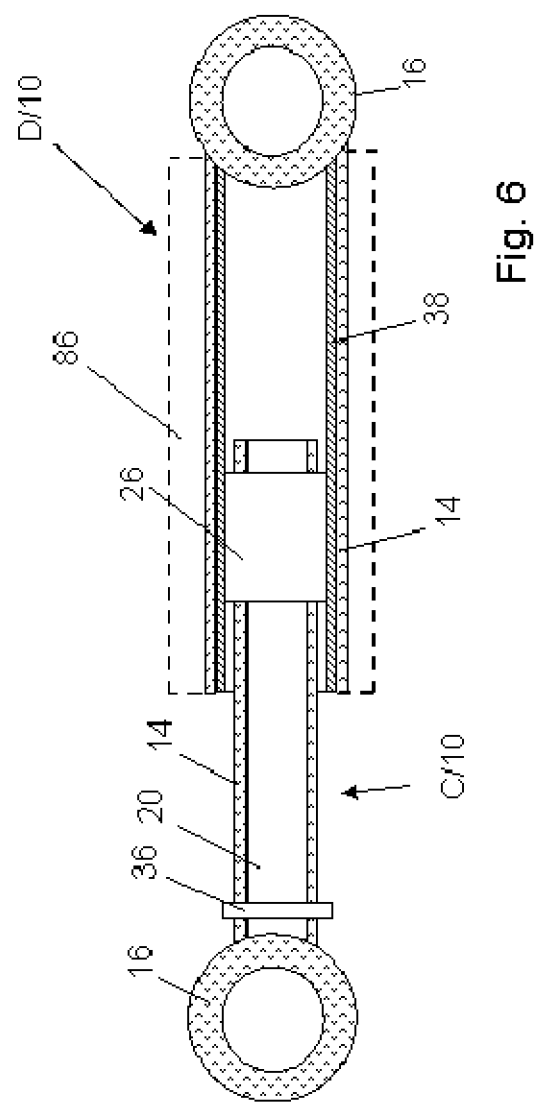

ARTICULATED ARM CMM

FIELD OF THE INVENTION

The present invention relates to an articulated arm, an articulated arm coordinate measuring machine and/or a modular assembly kit.

BACKGROUND

Usually an articulated arm coordinate measuring machine (short articulated arm CMM) is built by a heavy base for a stable standing and an articulated arm connected to the base. The articulated arm comprises various arm sections connected by pivot joints, wherein the final distal arm section is provided with a tool for measuring a part-to-be-measured, i.e. a tactile or optic measurement probe, or with a tool holder allowing exchange of the tool in order to adapt the tool to various measurement requirements. Examples for such articulated arm CMMs can be found i.e. in EP 2108917 A1 or EP 2283311 B1. The tool or measurement probe can be a tactile probe, like a ruby ball or an optical probe; both types of probe are well known in various embodiments by a skilled person. The holder can be equipped with buttons for controlling the measurement and can be arranged by itself in a rotatable or fixed way.

For measurement results of high precision it is necessary to know exactly the position of the measuring probe at the distal end of the arm of the articulated arm CMM in relation to a reference point, which reference point might be given by a particular point of the base of the articulated arm CMM or with respect to the part-to-be-measured. For this purpose angle encoders are placed at each pivot joint and in case of telescopic arm sections linear position encoders are provided. The encoders deliver their encoder signals to a central circuit, which central circuit is configured to derive the position of the arms relative to each other and/or relative to a reference point or reference coordinate system. The reference coordinate system is often created in relation to the part-to-be-measured by carrying out a kind of calibration measurement before starting the detailed measurement of the part-to-be-measured. In other words, the measurement process starts taking some reference measurements on the part-to-be-measured itself, for example: reference plane, reference edge and reference point. Thus, six degrees of freedom including the orientation of the probe relative to the part-to-be-measured are defined before the beginning of the detailed measurement. Subsequently all measurements are given relative to this reference.

Usually an articulated arm coordinate measuring machine is built by an external frame encapsulating susceptible components like the encoders, equipment for power supply and/or electronic signal transmission and so on. An example for such an articulated arm CMM is given in DE 4403901 A1. Although single components of this articulated arm CMM are modular in order to allow variable assembly configurations, the articulated arm CMM as such has to be constructed beforehand as a whole; subsequent amendments in order to adapt the articulated arm CMM to the requirements of the user is hardly possible and can only be realized with a considerable effort in work and time, because of the huge amount of single elements assembled within such an articulated arm CMM. In order to reduce the amount of single elements DE 60318396 T2 proposes to integrate the angle encoder into the pivot joint. However the amount of single elements is still considerable and causes a relative high weight even for transportable articulated arm CMMs as discussed in DE 4403901 A1 and DE 60318396 T2.

SUMMARY

Thus, some embodiments of the presented invention provide an articulated arm CMM, which is better adaptable to the requirements of the user and which is light in weight and can be produced cost efficiently.

The articulated arm has a first end and a second end, wherein the second end is configured to support a tool. The articulated arm comprises at least two longitudinal extending arm sections, wherein each pair of adjacent arm sections is connected to each other by a pivot joint having an integrated angle encoder generating encoder signals indicating the relative position of the arm sections. Further the articulated arm comprises electronic transmission means for transmitting encoder signals from the angle encoders towards a circuit, which circuit is configured to derive at least the relative position between the adjacent arm sections from the encoder signals and optionally to a reference point or reference coordinate system. According to the invention the articulated arm is a modular construction, wherein the arm sections are configured as arm section modules each having a PCB unit. Each PCB unit has an elongated PCB section element and at least one PCB encoder element connected to one end of the elongated PCB section element. The PCB encoder elements of adjacent arm sections are arranged face to face and pivotable against each other around a common axis, so that they form an angle encoder generating encoder signals. The PCB section elements comprise electronic transmission means for transmitting the generated encoder signals from the PCB encoder elements toward the circuit. This modular construction allows adapting the articulated arm to the individual requirements of the user and reduces the number of parts to be assembled for constructing such an articulated arm and consequently an articulated arm CMM having such an articulated arm. Further, manufacturing PCB units and module arm sections comprising those PCB units is cost-saving and weight-saving.

The PCB units are preferably constructed and produced according to "IPC-2223; Sectional Design Standard for Flexible Boards" issued by the Institute for Interconnecting and Packaging Electronic Circuits, November 1998. However, developments of designs and processes to manufacture PCB units beside and beyond these standards are possible as well.

In a preferred embodiment the elongated PCB elements comprise a first end provided with a sending unit and an opposite second end provided with a corresponding receiving unit, wherein transmission of the encoder signals from one PCB unit to an adjacent PCB unit is achieved from the sending unit to the adjacent receiving unit by wires or by radio means or optical means or by inductive or capacitive coupling. This type of signal transfer from one PCB unit to the adjacent PCB unit is weight-saving and cost-saving as no slip-rings have to be used to ensure infinite rotation. When using wires or radio means, it even allows using the whole surface of the PCB encoder elements for angle measurement—which can be used for an increased precision of the angle measurement—instead of using a part of the encoder element surface for sending or receiving electrodes.

In a further embodiment the PCB units comprise a first PCB encoder element connected to one end of the elongated PCB section element, wherein the first PCB encoder element is provided with a pattern. The same PCB unit may have a second PCB encoder element connected to an opposite end of the elongated PCB section element, which second PCB encoder element is provided with corresponding pattern recognition means. Or there is a PCB unit having such a second PCB encoder element instead of a first PCB encoder element. Using such PCB units—one with a first PCB encoder element and one with a second PCB encoder element—the angle encoder between those PCB units is configured having a first PCB encoder element arranged face to face with a second PCB encoder element and pivoting around a common axis.

In some embodiments, it may be advantageous to configure angle encoders as capacitive systems.

Particularly cost saving are modules, wherein the PCB section element and the at least one PCB encoder element of a PCB unit have the same deformation characteristic; especially when the PCB section element and the PCB encoder element are formed as a one piece PCB unit.

In order to increase the flexibility of use of a module it is advantageous to configure the PCB unit with at least one PCB encoder element connected to the elongated PCB section element by means of a flexible PCB connecting element. Said PCB connecting element has a higher deformability than the PCB elements connected by the PCB connecting element, so that the PCB section element and the PCB encoder element can be placed having a variable relative distance and/or can be arranged with an angle of at least ±90°, preferably in an angle range from −100° to +100°, and more preferably in an angle range from −180° to +180°.

In a further embodiment the PCB units include the necessary transmission means for the power supply.

Further, in some embodiments it may be advantageous if the PCB units include electronics configured to ensure at least one of the following tasks:
  generation of the excitation signals for the integrated angle encoders;
  decoding of the received signals of the integrated angle encoders;
  storage of calibration information of the angle encoders;
  transmission of the trigger signal for the synchronisation of the position measurement;
  transmission of the compensated measured position;
  transmission of the power supply;
  measurement and transmission of the local temperature;
  transmission and/or amplification of electrical signals providing from other axes or from the used tool, especially from a measurement probe (touch, trigger or continuous), at the second end of the articulated arm (2);
  measurement and transmission of other encoder parameters, like eccentricity, lateral or radial movement/displacement, wobbling, parallelism, signal strength.

Sensor systems and electronic equipment for measuring eccentricity, lateral or radial movement/displacement, wobbling, parallelism and so on are preferably integrated in angle encoders and/or linear position encoders. In WO 2011/117171 A1 possibilities to measure such encoder parameters and possibilities how to deal with the results of such measurements are described. Such measurements allow not only determination of the parameter and determination of deviation from normal conditions as well as calculative correction of those deviations from normal conditions, but allow also survey of bending phenomena in the various module arm sections caused by their weight and possibly increasing clearance in the joints caused by the bending phenomena.

In a preferred embodiment of the modular articulated arm the elongated PCB section elements of the PCB units are configured stiff enough to support the tool at the second end of the articulated arm and to build self-supporting arm sections. Further, the PCB encoder elements can be built stiff enough to build pivot joints, so that the angle encoder built by the PCB encoder elements is integrated in the pivot joint. For this purpose the PCB encoder elements arranged pivotable against each other and rotative around a common axis, so that the common axis of the PCB encoder elements of the PCB angle encoder is at the same time the rotation axis of the pivot element.

Preferably the stiff PCB encoder elements are arranged face to face with a small gap between them, wherein the gap is maintained by a spacer and the PCB encoder elements are pressed axially against the spacer by a spring force in order to maintain the gap stable.

In case the elongated PCB section elements and the PCB encoder elements are built in the described stiff way, it is not necessary to provide any supporting elements for the PCB elements, which reduces the weight and the costs for each module.

Particularly the stiffness of the PCB elements is achieved by a reinforcement structure.

Preferably the reinforcement structure comprises at least one element of the group comprising: carbon fibres, layers of carbon fibre reinforced plastics, layers of aluminium and/or aluminium-alloys and laminates of those layers. Using this type of reinforcement structure the weight of the modules can be maintained low.

Further, it is possible to configure the elongated PCB section elements in form of tubes in order to increase stability.

An articulated arm CMM assembled by arm section modules of this type may be rather a small articulated arm CMM for measuring small objects, e.g. objects of up to 50 cm-80 cm feed size or smaller.

With respect to a cost saving manufacturing it is advantageous, if the PCB units formed by such stiff elongated PCB section elements and such PCB encoder elements are formed together with the reinforcement structure in a single process or the PCB units are fixed to the reinforcement structure by gluing or welding. Welding can preferably be used when thermoplastics are applied within the PCB elements and/or the reinforcement structure.

Another preferred embodiment comprises arm section modules having an inner supporting structure, wherein the inner supporting structure comprising longitudinal extending frame elements, which support the elongated PCB section elements of the PCB units and/or disk like carrier elements supporting the PCB encoder elements of the PCB units.

The longitudinal extending frame elements are preferably elongated bodies made of metal or carbon fibre. In particular the elongated bodies are cylinders or tubes or elongated solid or hollow bodies with a polygon cross section. The carrier elements are made of metal or fibre reinforced plastic. The metallic tubes as well as the metallic carrier elements are preferably made of aluminium, aluminium-alloys or other light metal-alloys.

Using modules with an inner supporting structure of the above described type allows larger dimensions of each module and by this assembling of a larger articulated arm and a larger articulated arm CMM for measuring larger objects like cars.

PCB section elements in such modules are preferably as long as the arm section or the underlying frame element.

In a preferred embodiment the elongated PCB section elements and/or PCB encoder elements are fixed onto their supporting structure by gluing or welding, wherein the PCB section elements and/or PCB encoder elements have a deformation characteristic that allows them to clone the shape of their supporting structure when they are fixed on it.

In a further preferred embodiment the arm section modules are covered with plastic or temperable plastic foam, giving the modules the desired outer shape and protect the whole structure from temperature fluctuation. The weight of each module is only slightly increased by this measure.

In a further embodiment the PCB encoder elements are supported by a stiff disk like carrier element building encoder disks. In each case two of those encoder disks build a PCB angle encoder and at the same time they are part of a pivot joint, so that the angle encoder is integrated in the pivot joint. The disk like carrier elements are covered at their first surfaces with the PCB encoder elements and are arranged parallel and face to face to each other with their first PCB covered surfaces, they are further arranged pivotable against each other and rotative around a concentric axis, so that the concentric axis the encoder disks rotate around, is the rotation axis of the pivot element.

The PCB encoder elements are attached to the first surfaces of the disk like carrier elements by gluing or welding or another suitable method, wherein gluing is preferred as the glue can help balancing unevenness of the carrier surfaces and/or the PCB encoder elements in order to achieve plane surfaces, which can be arranged parallel face to face.

The carrier elements arranged face to face having a small gap between their PCB covered first surfaces. The gap is maintained stable particularly by means of a spacer and a spring mechanism pushing the rotating parts in a direction axially against each other.

In a preferred embodiment the carrier elements of the encoder discs have a circle or annulus form supporting on its first surface a PCB encoder element of an adapted circle or annulus form. In cases of a gap between the two encoder disks the spacer can be built by an axially extending protrusion portion of one or both carrier elements working together within the angle encoder. The surface of the protrusion portion, which is in rotative contact with the other protrusion portion or with a portion of the plane surface of the adjacent carrier element, shows good gliding properties. This can be achieved by an according cover layer, lining or coating.

The axis of the pivot joints and the angle encoders, respectively are built as carbon fibre or a metallic tubes.

The low weight of the single elements in this modular construction decrease stress and bending phenomena, thus the measurements carried out with an articulated arm CMM having such an articulate arm are very precise.

Further it is possible to provide slipping contacts within the gap of the angle encoder in order to provide power supply and/or data/signal transfer from one PCB unit to the adjacent PCB unit.

Further arm section modules can be formed in order to allow a telescopic lateral movement of these arm section modules. For this purpose a first frame element supporting a PCB unit at its outer surface and a second frame element supporting a PCB unit at its outer surface are provided. The second frame element is formed as a hollow body adopted to accommodate the first frame element, wherein the two frame elements are supported relative to each other by cage bearings or roller bearings in such a way that they can be moved relative to one another in a lateral telescopic way.

The telescopic lateral movement is detected by a PCB linear position encoder, build analogous as the PCB angle encoder described above.

The easiest way to form the two frame elements is to configure the first frame element as an elongated cylinder or a tube with a determined outer diameter and the second inner frame element as a tube with an inner diameter, said inner diameter is larger than the outer diameter of the first frame element. The first frame element is inserted into the second frame element and the two frame elements are supported laterally movable against each other and/or rotative movable against each other by ball bearings. PCB lateral movement encoders and/or PCB angle encoders are provided in order to indicate the relative position of the two arm section modules.

Such arm section modules which allow a telescopic lateral movement and/or rotative movement against each other and having preferably PCB lateral movement encoders and/or PCB angle encoders can be formed as well by self-supporting PCB units comprising elongated PCB section elements configured in form of tubes with different diameters.

Fixed to the last arm section module at the second end of the assembly a tool holder can be provided. The tool holder typically carries the kinematic connection for the tool and some buttons for the user to drive the system. Thus, at least the basic actions can be occurred by the user at the tool providing end of the articulated arm itself instead of using a connected programming station or a connected computer in order to control these actions. It further can either be designed allowing some rotation or allowing no rotation, depending on the targeted applications.

In another embodiment the arm section module at the second end of the assembly provides the tool instead of a tool holder, but can also be provided with the control buttons as described above.

In case the modular articulated arm as described above is used as articulated arm of an articulated arm CMM the tool is a tactile or optical measurement probe, wherein the tactile probe in particular is a ruby ball. Further, the articulated arm at its first end is preferably connected to a base in order to give the articulated arm a stable stand. Additionally, the circuit is configured or programmed to analyse the signals/data, generated by the measurement probe, and provide according results to the user by means of a connected programming station or a connected computer, a monitor or other output means.

However, for a person skilled in the art it can easily be seen that the modular articulated arm as described above can be used instead of with a measurement probe with other tools, such as a camera, a scanner, a drill, a scribing tool, like a laser or painting head, a cutting head etc. Consequently the provided circuit is configured or programmed accordingly to control the drill, the scribing-/painting-/cutting head, controlling the scanner and analysing the results of the scanner, analysing the pictures of the camera, etc. and present the according results by means of a monitor, a connected computer or a connected programming/control station.

Further, there is a circuit integrated in the articulated arm itself or provided with the articulated arm CMM or another machine comprising such an articulated arm, which circuit is configured to achieve signals form the PCB encoder elements and to derive the relative position between the arm sections and optionally their relative position to a reference point or to a reference coordinate system.

Thus, a modular assembling kit for constructing an articulated arm can be provided comprising at least arm section modules each having a PCB unit and further comprising common axis' as described above. Said PCB units comprise an elongated PCB section element and at least one PCB encoder element connected to one end of the elongated PCB section element. The PCB section elements comprise the electronic transmission means for transmitting encoder signals from the PCB encoder elements.

Further the assembling kit comprises at least one element out of the group comprising: an arm section module configured to accommodate a tool and/or a an arm section module configured to accommodate a tool holder fixable at the arm section module in order to build at the arm section module at the second end of the articulated arm; a base the arm section module at the first end of the articulated arm is connectable to; a circuit configured to achieve signals form the PCB encoder elements and configured to derive the relative position between the arm sections and optionally their relative position to a reference point or to a reference coordinate system; a circuit configured or programmed to control the tool and to analyse the signal/data provided by the tool and present the result of those analyses; an according program stored on a storage means. The circuit configured to achieve signals form the PCB encoder elements and the circuit configured to control and/or analyse signals/data of the tool(s) can be the same circuit.

The tools can be at least one out of the group comprising: ruby balls as tactile measurement probes, optical measurement probes, cameras, scanners, drills, scribing tools, laser heads, painting heads, cutting heads and so on.

The modular approach allows the assembly of different standard products, with the advantage only to use common components, reducing the value of the necessary stock. Offering a commercial advantage, a configurator could be used in relation with this modular product. Hence, a customer could configure the product he exactly needs.

To reduce the costs of the system further, calibration can be reduced to a minimum of steps or avoided at all. Targeting arm accuracies can be achieved by the rough measuring system. If this is not possible, individual components should be calibrated before assembly, allowing for a simple and common process. The instrument as a whole also could be mapped, in the extreme cases.

BRIEF DESCRIPTION OF THE DRAWINGS

The invention will be explained in greater detail below with reference to examples of possible embodiments. Same elements in the figures are indicated by the same index numbers. It should be understood that the drawings are diagrammatic and schematic representations of such example embodiments and, accordingly, are not limiting the scope of the present invention, nor are the drawings necessarily drawn to scale. The drawings show:

FIG. 1 a first embodiment of a PCB unit;

FIG. 2 a second embodiment of a PCB unit;

FIG. 3a, 3b, 3c a top view and two side views of a third embodiment of a PCB unit;

FIG. 4a, 4b two embodiments of arm section modules in section views;

FIG. 5 an embodiment of an angle encoder;

FIG. 6 embodiment A' of FIG. 4a in a slight modification; and

DETAILED DESCRIPTION

Figure 7:
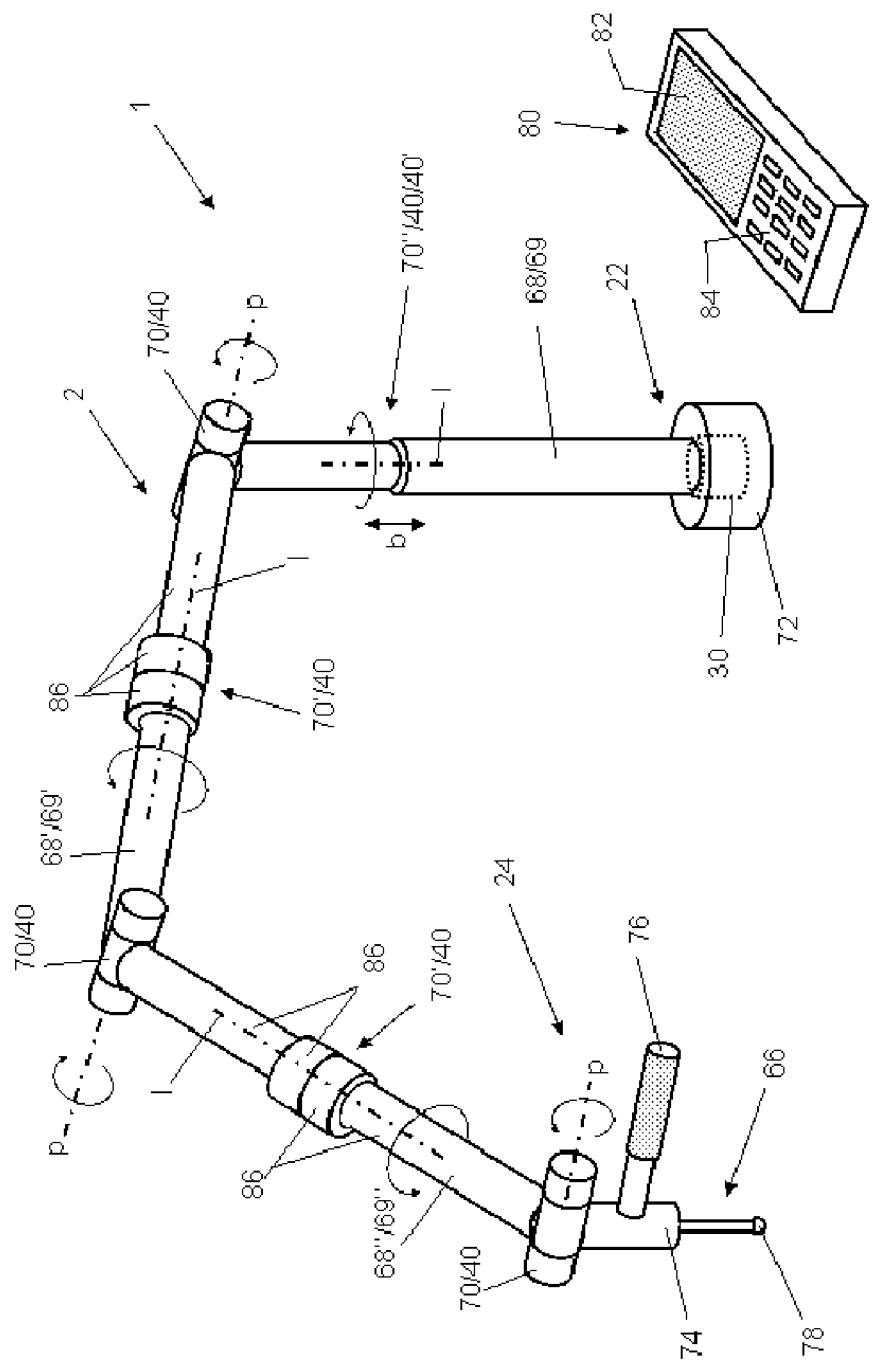
FIG. 7 an articulated arm CMM according to the invention.

FIGS. 1 to 4 show different embodiments of Printed Circuit Board (PCB) units 10, 12 comprising each an elongated PCB section element 14 and at least one PCB encoder element 16. The PCB section elements include transmission means 28 (shown explicitly only in FIGS. 1 and 2) for transmitting at least encoder signals of the PCB angle encoder elements 16. In the embodiments shown here the PCB encoder elements 16 are built as annuli. However, depending on the construction requirements PCB encoder elements can also be formed having another rotation symmetry like circles. Further the PCB section element 14 is provided at one end with a sender unit 32a and at the other end with a receiving unit 32b in order to transmit power supply, signals of the PCB encoder elements or other data and signals from one PCB unit to the adjacent PCB unit. Transmission thereby can be performed by radio means, infrared or Bluetooth signals, capacitive or inductive coupling. As indicated by the arrows in FIG. 1 the PCB section element can be formed as a thin plane or foil which can be bend to form a tube as it is shown in FIG. 2 or to cover the outer face of a frame element 20 (see FIG. 4).

FIG. 1 shows a PCB unit 10 having only one PCB encoder element 16 connected stiffly to one end of the PCB section element 14. PCB encoder element 16 and PCB section element 14 are in this embodiment of the same deformability and formed as a one peace PCB unit 10.

FIGS. 2 to 3 show PCB units 12 having two PCB encoder elements 16, 16a, 16b, one connected to one end of the PCB section element 14 and the other one connected to the opposite end of the PCB section element 14. Again the PCB section element 14 and the PCB encoder elements 16 can be of the same deformability, but as well can be of different deformability and different further properties.

The first PCB encoder elements 16a—shown explicitly in FIGS. 2 and 4—have pattern 34a; the second PCB encoder elements 16b have a pattern recognition means 34b. Arranging a first PCB encoder element 16a of one PCB unit and a second PCB encoder element 16b of another PCB unit pivoting around a common axis and the pattern 34a and the pattern recognition means 34b face to face, a PCB angle encoder or short angle encoder 40 is obtained. Preferably this angle encoder 40 is created as a capacitive system, but an optic system or other well known angle encoder systems can be used as well.

In FIG. 2 the PCB encoder elements 16a, 16b connected stiffly to the PCB section element 14. However, the PCB encoder elements 16, 16a, 16b can also be connected to the PCB section element 14 by the means of a flexible PCB connecting element 18 as it is shown in FIGS. 3a to 3c. FIG. 3a shows a top view of this special embodiment of a PCB unit 12 having two PCB encoder elements 16, one—in this example at the left hand side of the figures—connected stiffly to the elongated PCB section element 14, the other one—at the right hand side of the figures—connected flexible to the PCB section element 14 by means of a flexible connection element 18. As it can be seen in the side views in FIGS. 3b and 3c, the flexible PCB connection element 18 allows arrangements of the PCB section element 14 and the PCB encoder element 16 having a variable distance (FIG. 3b) or having an angle of at least about 90° (FIG. 3c).

If there are any issues with stiffness of the PCB units 10, 12, reinforcement with either laminated aluminium directly on the various parts 14, 16 of the PCB unit or a carbon fibre part, glued on the various parts 14, 16 of the PCB unit, can be used. Of course, all electronic components must be integrated in the PCB units 14, 16. To have a working system, the onboard electronics must ensure the following tasks:

Generation of the excitation signals for the integrated lateral or angle encoder;

Decoding of the received signals of the integrated lateral or angle encoder;

Storage of calibration information of the encoders;

Transmission of the trigger signal for the synchronisation of the position measurement;

Transmission of the compensated measured position;

Possibly, transmission, to the following elements, of the power supply;

Possibly, measurement and transmission of the local temperature;

Possibly, measurement and transmission of other lateral or angle encoder parameters: eccentricity, wobbling, parallelism, lateral and/or radial displacement/movement, signal strength and so on;

Possibly, transmission and/or amplification of other electrical signals providing from other arm sections or from the used tools, especially the measurement probes (touch trigger or continuous), at the end of the articulated arm.

In cases the PCB units 10, 12 are configured stiff enough to be self-supporting by means of a reinforcement structure the articulated arm of an articulated arm CMM can be built only by these PCB units 10, 12 which than figurate at the same time as arm section modules. The stiffness is than preferably increased further by either bending the PCB section elements 14 forming tubes or forming the PCB section elements 14 as tubes when manufactured.

However, in case larger articulated arm CMMs should be built the PCB units 10, 12 have to be increased in their dimensions and because of increasing weight they have to be supported by an inner supporting structure. FIG. 4a shows a first embodiment A" of such an arm section module and a second embodiment A' of such an arm section module.

The first embodiment A" shown in FIG. 4a comprises a frame element 20" having glued on its surface a PCB section element 14". The PCB section element 14" is as long as the frame element 20", which in this example is built as a carbon fibre or a metallic tube. At its one end a second PCB encoder element 16b" is stiffly connected to the PCB section element 14". The PCB encoder element 16b" is glued onto the surface of a disk like carrier element (see FIG. 5) made of metal or fibre reinforced plastic.

The second embodiment A' of an arm section module in FIG. 4a comprises a common elongated axis 20' and an outer tube 38 accommodating the axis along half of its length. Outer tube 38 and axis 20' are supported against each other by ball bearings 26. The outer tube 38 can be made e.g. of a light-metal, carbon fibre or a temperable foam. A section view through the bearing 26 is given in FIG. 4b. The outer tube 38 and the bearings 26 serve as stabilising elements for the long axis 20' and allow a rotation of the two ends of the arm section module A' provided with PCB encoder elements 16a and 16b' around the axis 20'. Hence PCB encoder elements 16a and 16b' are part of two PCB units 12, 12' of this embodiment A'.

The first PCB unit 12 with two PCB encoder elements 16a, 16b at the left hand side of FIG. 4a is glued with its PCB section element 14 onto the outer surface of the axis 20'. The PCB section element 14 is at its one end stiffly connected to a first PCB encoder element 16a, which protrudes over the axis 20'. The first PCB encoder element 16a is supported by a stiff carrier element (not shown), on which it e.g. is glued. At the opposite end the PCB section element 14 is flexible connected to a second PCB encoder element 16b by a flexible connecting element (not shown), which is bent by 90°. Optionally there can be fixing elements 36 made of plastic or light-metal in order to secure the PCB section element 14 on the outer surface of the axis 20' additionally to the fixation by the glue. Fixing elements 36 are attached from outside to the assembly of axis 20' and PCB section element 14 and can be fixed like a buckle or bracket or are glued onto the PCB section element 14.

The second PCB unit 12' having two PCB encoder elements 16a', 16b', which is shown on the right hand side of FIG. 4a, is glued with its PCB section element 14' onto the outer surface of tube 38. PCB section element 14' is stiffly connected to a second PCB encoder element 16b', which protrude over the tube 38 (right hand side of FIG. 4a) and is well supported by a stiff carrier element (not shown). At the opposite end of the PCB section element 14' a first PCB encoder element 16a' is flexible connected to the PCB section element 14' by a flexible connecting element 18 (not shown) and is arranged in an angle of 90°. The front side of the tube 38 having the form of an annulus supports the stiff first PCB encoder element 16a'. If necessary an additional carrier element can be provided as supporting structure. The two PCB units 12, 12' are adapted to the length of the axis 20', so that the PCB encoder elements 16b, 16a' in the middle of the axis can be arranged face to face in order to form an angle encoder 44 and at the same time the PCB encoder elements 16a, 16b' protrude right over the axis 20' and the outer tube 38, respectively, so that they can form PCB angle encoders 40 too with PCB encoder elements of adjacent arm section modules like it is indicated at the left hand side of FIG. 4a. The advantage of this arm section module A' is that the relative long distance between the bearings 26, improving the accuracy of the rotary axis 20'. As the outer diameter of the right-hand side is bigger than the outer diameter of the left-hand side, the gained diameter of the left-hand side could be used to integrate a spin grip, allowing the easy use as a final arm.

FIG. 6 shows another embodiment of an arm section module, which is very similar to the embodiment A' given in FIG. 4a. The difference between these two embodiments is that the used PCB units 10 have only one PCB angle encoder element 16, each of which is stiffly connected to the PCB section elements 14 at their opposite ends. The flexible connected PCB angle encoder elements in the middle are not necessary in this embodiment, because the element C with the smaller diameter, given at the left hand side in FIG. 6, is accommodated in the tube 38 of the element D given at the right hand side of FIG. 6, only for a lateral movement along the concentric axis (not shown) of frame element 20 and tube 38. The frame element 20 with the PCB section element 14 on its outer surface is supported by cage bearing 26 that will make use of most of the volume at disposal in tube 38. The lateral movement is detected by a lateral movement encoder (not shown, which is partly integrated in the PCB section element 14 of element C and partly in the tube 38 of element D.

Although not shown, for a person skilled in the art it is an easy step to combine the embodiment A' of FIG. 4a and the embodiment of FIG. 6 in order to obtain an arm section module, wherein the two ends can be moved laterally and pilotable against each other. Furthermore a person skilled in the art is able to combine single elements of the shown embodiments in a useful way even if those combinations are not explicitly described or figuratively shown in this description.

FIG. 5 presents an angle encoder 40 also called PCB angle encoder 40. In this example the PCB encoder elements 16a and 16b are of annulus form. They are fixed on plane first surfaces of disk like carrier elements 44 by glue 45. The PCB covered first surfaces of the carrier elements 44 are arranged in the assembled angle encoder face to face and parallel to each other. The disk like carrier elements 44 have a circle like form with aligned middle holes for accommodating a common axis 48, so that the axis 48 of the angle encoder 40 is the common axis 48 of the PCB encoder elements and at the same time the rotation axis 48 of the pivot joint. The carrier elements 44 in this example both have protrusions 52 in their centres, protruding axially from the disk and having plane front sides parallel to the PCB covered first surfaces of the carrier elements 44. In the assembled angle encoder 40 the protrusions 52 protrude axially toward each other and they are in touch. However, the front sides of the protrusion portions 52 have good gliding properties so that the pivoting movement against each other doesn't cause too much friction. The both protrusions 52 serve as a spacer between the two carrier elements 44, so that a small gap 50 is obtained between the two PCB covered first surfaces of the carrier elements 44. In order to prevent fluctuation in the gap dimension the two carrier elements 44 are pressed axially towards each other by a spring force F. Spring force F is generated in this example by springs 56, which are guided by the common axis 48, which projects axially outwardly over the carrier elements 44, wherein the springs are pre-tensioned by nuts 54 fixed on the common axis 48. If necessary a gliding ring (not shown) can be placed between the nut 54 and the spring as well as between the spring and the carrier element 44.

The gluing of the PCB encoder elements 16 onto the first surface of the disk like carrier elements 44 needs some care, to make sure the resulting surface is flat enough. Using specific gluing procedure applying vacuum means is advantageous in order to ensure very plane PCB covered surfaces, which can be assembled in parallelism of high precision, because misalignments or thickness fluctuations of the PCB encoder elements 16 can be compensated by the glue.

It has to be mentioned that unlike for the longitudinal rotary axis as shown in arm section module A' in FIG. 4a, no slip-rings are necessary here, as the rotation does not need to be infinite.

In embodiments, where power supply needs to be transmitted to all elements of the system and/or a serial bus is provided for the transmission of signals and data e.g. regarding the positions of all encoders, slip-rings can be used in the encoder assemblies. It is however better to avoid the use of slip-rings and therefore transmit the needed power by inductive means. An intermediate solution can be obtained adding two slipping contacts to the encoder assembly. To avoid the need to transmit power supply through the entire arm, accumulators could be integrated in each arm section module. The charging process would then be ensured while the arm is placed in its rest position, by using either electrical contacts or inductive means. On their side, the trigger and data signals transmission advantageously also must be ensured using capacitive, optical or radio means.

Finally, the arm section modules can comprise foam 86 or soft plastic to cover the outer surfaces of the PCB units in order to ensure the necessary shape or look. Further, the foam has the advantage to serve as temperature isolation.

In FIG. 7 an articulated arm CMM 1 according to the invention is shown. The articulated arm CMM 1 comprises an articulated arm 2 with various adjacent arm sections 68, 68', 68" which are configured as arm section modules 69, 69', 69" or short: arm-modules 69, 69', 69". The arm section modules are formed as described above comprising PCB units 10, 12 and in this example covered by a foam 86.

As it can be seen the first end 22 of the articulated arm 2 is supported by a base 72, so that the articulated arm CMM 1 can be positioned onto a surface, particularly a floor or a table. The base 72 contains the circuit 30 and all other global electronics and accumulators, if needed.

The articulated arm CMM 1 is designed for determining a measuring position of the tool 66, which in this example is built by a tactile measurement probe 78. Thus, connected to the base 72 are several arm-section modules 69, 69', 69" linked by pivot joints 70, 70', 70" having integrated angle encoders 40, so that the arm-modules 69, 69', 69" are pivotable movable against each other. At the last arm-module 68"/69" at the second end 24 of the articulated arm 2 a tool holder 74 for a tool 66 is pivotable attached, thus, the tool 66 being freely movable within a given volume. The tool 66/measurement probe 78 in this example is designed as a ruby ball 78 configured for contacting a surface point to be measured. The articulated arm CMM 1 can be programmed to do so or for example, the measurement probe 78 can be manually operable by a user using the handle 76 attached to the tool holder 74. The user also can use a separate control unit 80 with input keys 84 and a display 82 in order to control the articulated arm CMM 1. The control unit can communicate with the circuit 30 or other global electronics by radio, infrared, bluetooth or cable.

Furthermore, encoders 40, 40" are allocated to the joints 70, 70', 70", and configured to measure the current relative setting of each of the joints 70, 70', 70". Thereby, the encoders 40, 40', designed as PCB encoders as described above and as angle encoders 40 or lateral encoders 40'. The angle encoders 40 are integrated in pivot joints 70 enabling rotation of adjacent arm modules around an longitudinal axis 1 or pivot joints 70 enabling pivotable movement of adjacent arm modules around axis p more or less perpendicular to the longitudinal axis 1. Lateral encoders 40' are integrated in lateral joints (not shown) or integrated together with an PCB angle encoder 40 in a combined lateral-pivot joint 70". Such a combined lateral-pivot joint 70" enables lateral movement of adjacent arm modules along and rotation of adjacent arm modules around a longitudinal axis 1.

The measured actual setting of each joint 70, 70', 70" is transmitted to the circuit 30. By combining the relative settings of each joint 70, 70', 70", the circuit 30 calculates the internal position of the tool 66—respectively the position of the measurement probe 78 and the point being touched by the probe 78—relative to the base 72 of the articulated arm coordinate measuring machine 1 or a previously defined coordinate system. For example, the coordinates of the calculated internal position relative to the base 72 may be displayed on a display 82 of the control unit 80.

What is claimed is:

1. An articulated arm comprising:
    a first end and a second end, the second end configured to support a tool;
    at least two longitudinal extending arm sections between the first end and the second end, wherein each pair of adjacent arm sections is connected with each other by a pivot joint having an integrated angle encoder generating encoder signals indicating the relative position of the arm sections; and
    electronic transmission means for transmitting encoder signals from the angle encoders towards a circuit configured to derive at least the relative position between the adjacent arm sections from the encoder signals and to a reference point or reference coordinate system;

wherein the articulated arm coordinate measuring machine is a modular construction, wherein the arm sections are configured as arm section modules having a printed circuit board unit, said printed circuit board unit elongated printed circuit board section element printed circuit board encoder element end of the elongated printed circuit board section comprises an and at least one connected to one element;

wherein the printed circuit board encoder elements of adjacent arm sections are arranged face to face and pivotable against each other around a common axis, so that they form an angle encoder; and wherein the printed circuit board section elements comprise the electronic transmission means for transmitting the encoder signals from the printed circuit board encoder elements toward the circuit.

2. The articulated arm according to claim 1, further comprising sensor systems and electronic equipment, wherein the sensor systems is integrated in angle encoders and/or linear position encoders to measure eccentricity, wobbling, lateral and/or radial displacements.

3. The articulated arm according to claim 1, wherein the elongated printed circuit board elements comprising a first end provided with a sending unit and an opposite second end provided with a corresponding receiving unit, wherein transmission of the encoder signals from one printed circuit board unit to an adjacent printed circuit board unit is achieved from the sending unit to the adjacent receiving unit by wires or by radio means or optical means or by inductive or capacitive coupling.

4. The articulated arm according to claim 1,
wherein the printed circuit board units comprise a first printed circuit board encoder element connected to one end of the elongated printed circuit board section element and provided with a pattern and/or a second printed circuit board encoder element connected to an opposite end of the elongated printed circuit board section element and provided with corresponding pattern recognition means;

wherein an angle encoder comprises a first printed circuit board encoder element arranged face to face with a second printed circuit board encoder element; and wherein the angle encoder is configured as a capacitive system.

5. The articulated arm according to claim 1, further comprising arm section modules, wherein the printed circuit board section element and the at least one printed circuit board encoder element of a printed circuit board unit have the same deformation characteristic, wherein the printed circuit board section element and the printed circuit board encoder element are preferably formed as a one piece printed circuit board unit.

6. The articulated arm according to claim 1, further comprising arm section modules, wherein at least one printed circuit board encoder element is connected to the elongated printed circuit board section element by means of a flexible printed circuit board connecting element, said printed circuit board connecting element having a higher deformability than the connected printed circuit board elements.

7. The articulated arm according to claim 1, wherein the elongated printed circuit board section elements of the printed circuit board units are configured stiff enough to support the tool and to build self-supporting arm sections and/or the printed circuit board encoder elements are built stiff enough to build pivot joints, wherein the stiffness is achieved by a reinforcement structure.

8. The articulated arm according to claim 7, wherein the reinforcement structure comprising at least one element of the group comprising: carbon fibers, layers of carbon fiber reinforced plastics, layers of aluminum and/or aluminum-alloys and laminates of those layers.

9. The articulated arm according to claim 1, further comprising arm section modules having an inner supporting structure, wherein the inner supporting structure comprising longitudinal extending frame elements supporting the elongated printed circuit board section elements of the printed circuit board units and/or disk like carrier elements supporting the printed circuit board encoder elements of the printed circuit board units.

10. The articulated arm according to claim 9, wherein the longitudinal extending frame elements are longitudinal extending bodies or longitudinal extending hollow bodies or hollow tubes and the carrier elements are shaped as circles or annuli.

11. The articulated arm according to claim 9, wherein the supporting structure are formed from at least one of the materials out of the group of: aluminum or light metal alloys, honeycomb structured metals or metal alloys, honeycomb structured plastics, plastic foams, carbon fiber, fiber reinforced plastics, honeycomb structured fiber reinforced plastics, fiber reinforced plastic foams, fiber reinforced metals and metal alloys.

12. The articulated arm according to claim 9, wherein the printed circuit board units, printed circuit board section elements and/or printed circuit board encoder elements are fixed onto their supporting structure by gluing or welding, wherein the printed circuit board units, printed circuit board section elements and/or printed circuit board encoder elements have a deformation characteristic that allows them to clone the shape of their supporting structure when they are fixed on it.

13. The articulated arm according to claim 9, wherein it comprises arm sections built by arm section modules comprising a first frame element supporting a printed circuit board unit and a second frame element supporting a printed circuit board unit, which second inner frame element is formed as a hollow body adopted to accommodate the first frame element, and wherein the two frame elements are supported relative to each other by cage bearings or roller bearings in a way that they can be moved relative to one another in a telescopic way and wherein the telescopic lateral movement is detected by a printed circuit board linear position encoder.

14. The articulated arm according to claim 9, wherein a first frame element is configured in form of an elongated cylinder or a tube with an outer diameter and a second frame element formed as a tube with an inner diameter, said inner diameter of the second frame element is larger than the outer diameter of the first frame element and the first frame element is inserted into the second frame element, wherein the two frame elements are supported laterally movable against each other and/or rotative movable against each other by ball bearings.

15. The articulated arm according to claim 1, wherein the printed circuit board elements include electronics configured to perform at least one of the following tasks:
generation of the excitation signals for the integrated angle encoders;
decoding of the received signals of the integrated angle encoders;
storage of calibration information of the encoders;
transmission of the trigger signal for the synchronization of the position measurement;

transmission of the compensated measured position;
transmission of the power supply; measurement and transmission of the local temperature;
measurement and transmission of other encoder parameters; and
transmission and/or amplification of electrical signals providing from other arm sections or from the used tool at the second end of the articulated arm.

16. An articulated arm according to claim 1, wherein the arm section modules are covered with plastic or temperable plastic foam.

17. An articulated arm according to claim 1, further comprising:
- a base supporting the arm section module at the first end of the articulated arm; and/or
- a tool holder fixable at the arm section module at the second end of the articulated arm; and/or
- a circuit achieving signals form the printed circuit board encoder elements, which circuit is configured to derive the relative position between the arm sections module and the relative position to a reference point or to a reference coordinate system; and/or
- one or more accumulators and or power sources.

18. An articulated arm coordinate measuring machine comprising:
- an articulated arm with articulated arm sections connected with each other by a pivot joint having an integrated angle encoder generating encoder signals indicating the relative position of the arm sections;
- a base supporting the articulated arm; and
- a circuit configured to derive at least the relative position between the adjacent arm sections from the encoder signals and to a reference point or reference coordinate system,
- wherein the articulated arm is the modular circulated arm of claim 1.

19. A modular assembling kit for constructing an articulated arm coordinate measuring machine according to claim 18, the modular assembling kit comprising:
comprising at least arm section modules having a printed circuit board unit, said printed circuit board unit comprises an elongated printed circuit board section element and at least one printed circuit board encoder element connected to one end of the elongated printed circuit board section element,
wherein the printed circuit board section elements comprise the electronic transmission means for transmitting encoder signals from the printed circuit board encoder elements and common axis the printed circuit board encoder elements rotate around when forming an angle encoder.

20. The modular assembling kit according to claim 18 further comprising:
- a tool and/or a tool holder fixable at the arm section module at the second end of the articulated arm and a base, the arm section module at the first end of the articulated arm is connected to, wherein the tool is at least one out of the group comprising: ruby balls as tactile measurement probes, optical measurement probes, cameras, scanners, drills, scribing tools, laser heads, painting heads, cutting heads.

21. The modular assembling kit according to claim 18 for constructing an articulated arm coordinate measuring machine, the modular assembling kit comprising:
- a tool and/or a tool holder fixable at the arm section module at the second end of the articulated arm and a base, the arm section module at the first end of the articulated arm is connected to, wherein the tool is a tactile measurement probe and/or an optical probe;
- a circuit configured or configurable/programmable to control the tool and/or analyze the signals/data derived from the tool; and
- a storage means storing the program to control and/or analyze the tool.

\* \* \* \* \*